United States Patent [19]
Andrews et al.

[11] Patent Number: 6,075,554
[45] Date of Patent: *Jun. 13, 2000

[54] PROGRESSIVE STILL FRAME MODE

[75] Inventors: Barry D. Andrews; Paul A. Voois, both of Sunnyvale, Calif.

[73] Assignee: 8x8, Inc., Santa Clara, Calif.

[*] Notice: This patent is subject to a terminal disclaimer.

[21] Appl. No.: 08/944,311

[22] Filed: Oct. 6, 1997

Related U.S. Application Data

[63] Continuation-in-part of application No. 08/768,894, Dec. 17, 1996.
[51] Int. Cl.[7] .................................................. H04N 7/14
[52] U.S. Cl. .............................. 348/15; 348/17; 348/18
[58] Field of Search ................................. 348/14, 15, 16, 348/17, 18, 19; 358/262.1, 261.3, 430, 447, 427, 261.2

[56] References Cited

U.S. PATENT DOCUMENTS 5,691,767  11/1997  Tahara ..................................... 348/384

FOREIGN PATENT DOCUMENTS

000439675A2  8/1991  Germany ....................... H04N 7/133

OTHER PUBLICATIONS

ITU–T Telecommunication Standardization Sector of ITU, H.261 Annex D Still Image Transmission, pp. 1–32 (1993).

ITU–T Telecommunication Standardization Sector of ITU, Annex C: RTP payload format for H.261 video streams (Normative), pp. 108–113; Jun. 19, 1996.

JPEG: Still Image Data Compression Standard, Chapter 10: JPEG Coding Models, pp. 169–188 (undated).

*Primary Examiner*—Curtis A. Kuntz
*Assistant Examiner*—Melur Ramakrishnaiah

[57] ABSTRACT

A still image is progressively transmitted over a communications channel by computing, encoding, and outputting for transmission difference information representing the difference between the still image and a previously-transmitted image that has been stored at a remote location. This process is repeated, with additional difference information being generated to supplement the image received at the remote location, such that the quality of the image at the remote location improves over time. The difference information may be encoded in a format compatible with existing video compression standards and processed by a receiving terminal regardless of the presence of still mode capability.

14 Claims, 9 Drawing Sheets

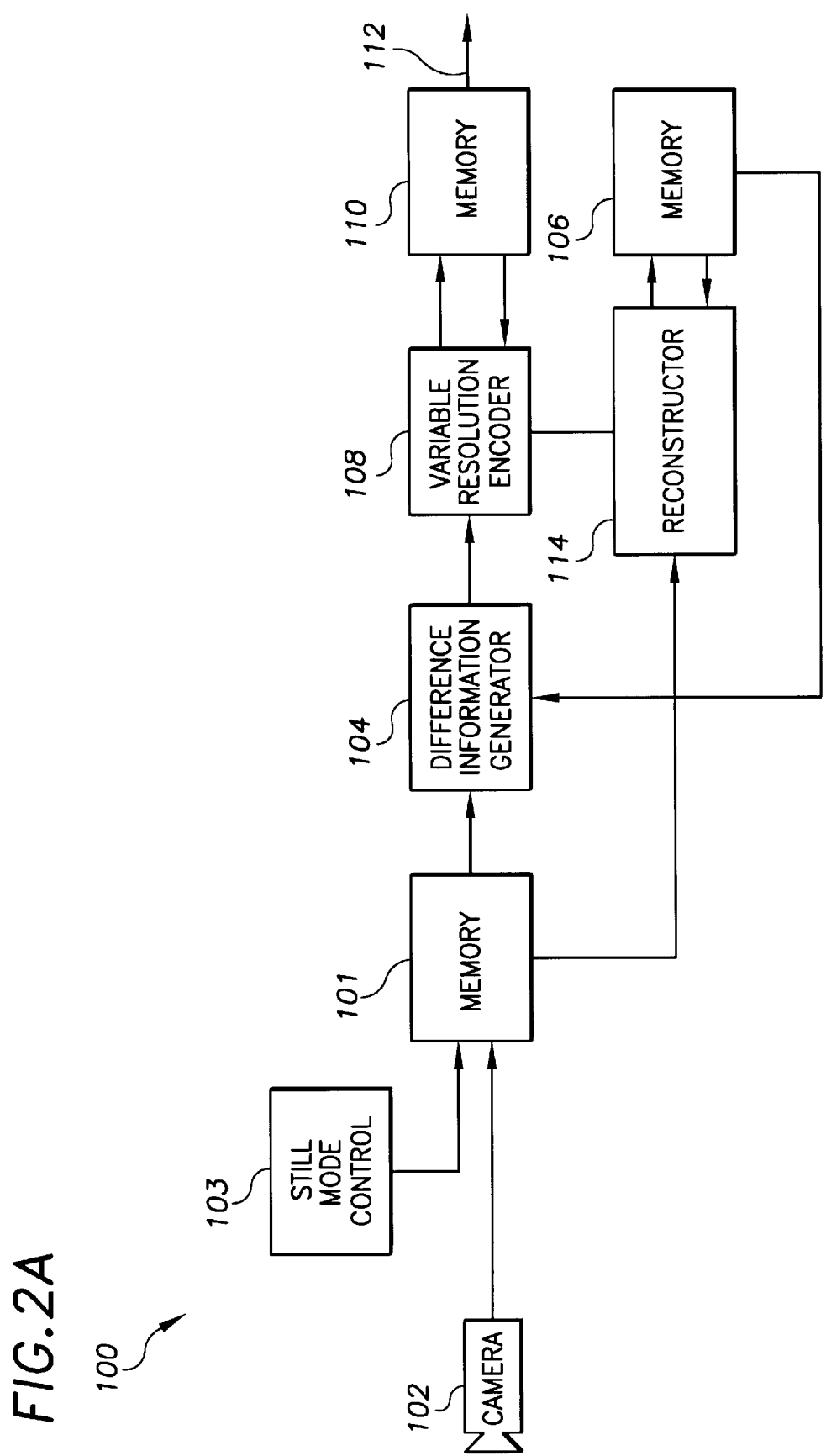

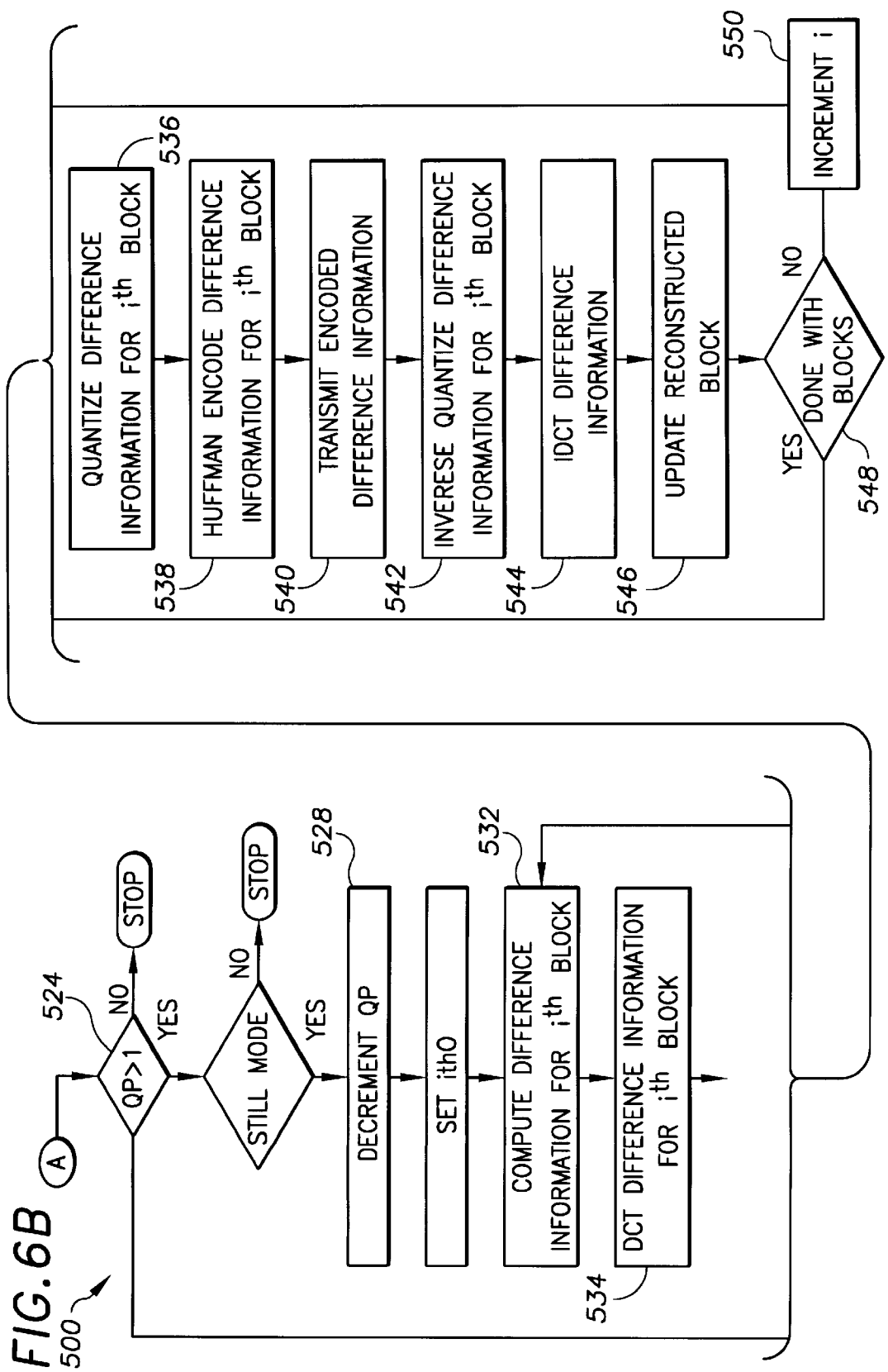

6,075,554

PROGRESSIVE STILL FRAME MODE

CROSS-REFERENCE TO RELATED APPLICATIONS

This is a continuation-in-part of patent application Ser. No. 08/768,894, filed Dec. 17, 1996.

FIELD OF THE INVENTION

The present invention relates to image transmission. More particularly, the present invention relates to a method and apparatus for progressively transmitting a still image.

BACKGROUND OF THE INVENTION

Videocommunication equipment, such as videoconferencing systems and videophone devices, have enabled people to communicate visually without having to travel to a common location. As a result, communication participants can be separated by large distances.

A typical videoconferencing application uses a video camera to capture a series of images of a target, such as a meeting participant or a document. The series of images is encoded as a data strewn and transmitted over a communications channel to a remote location. For example, the data stream may be transmitted over a phone line, an integrated services digital network (ISDN) line, or the Internet. The encoding process is typically implemented using a digital video coder/decoder (codec), which divides the images into blocks and compresses the blocks according to a video compression standard, such as the ITU-T H.263 and H.261 recommendations. In standards of this type, a block may be compressed independent of the previous image or as a difference between the block and part of the previous image.

In a typical videoconferencing system, the data stream is received at a remote location, where it is decoded into a series of images, which may be viewed at the remote location. Depending on the equipment used, this process typically occurs at a rate of one to thirty frames per second.

In some videoconferencing applications, it is desirable to transmit a high quality still image. Until the image is completely received and decoded, the receiving terminal is often unaware of its content. Some decoders decode and display a block only after they have received the complete image. With the image being transmitted as a series of blocks, considerable delay is often involved in transmitting the entire image. For example, in applications where the available bandwidth for transmitting data is small, transmission of a 352×288 pixel image may require up to a minute. In order to transmit still images more quickly, a lower image quality may be used for compressing the image.

SUMMARY OF THE INVENTION

Generally, the present invention provides methods and arrangements for progressively transmitting and receiving high quality still images. In one particular embodiment of the invention, a location has stored a previously-transmitted image. Difference information is computed that represents a difference between the previously-transmitted image and the still image. The difference information is encoded as encoded data in a format capable of being processed at the second location. The encoded data is output for transmission over the communications channel. A refined image is reconstructed using the previously-transmitted image and the difference information, and is stored. The quality of the refined image is increased until it satisfies a quality threshold by iteratively repeating the steps of computing the difference information, encoding the difference information, outputting the encoded data, constructing the refined image, and storing the refined image. During each iteration, a parameter is adjusted to increase the quality of the refined image. In another embodiment of the present invention, a system provides these capabilities.

In another method embodiment of the present invention, a still image is transmitted from a first location to a second location using a communications channel. The second location has stored a first image that was received in response to a previous still image request. Difference information representing a difference between the first image and the still image is computed. This difference information is encoded as encoded data in a format capable of being processed at the second location. The encoded data is output for transmission over the communications channel. A refined image is constructed using the first image and the difference information, and is stored. A quality of the refined image is increased until it satisfies a quality threshold by iteratively repeating these steps, adjusting a parameter during each iteration to increase the quality of the refined image.

In another embodiment of the invention, a system for transmitting a still image at a desired quality using a communications channel is provided. The system includes a still mode control block that is configured and arranged to selectively enable a still mode. A first memory is configured and arranged to, when the still mode is not enabled, store a series of images in succession. When the still mode is enabled, the first memory stores one of the series of images as the still image to be transmitted. A difference information generator is configured and arranged to generate difference information representing a difference between a reconstructed image and the still image. A variable quality encoder is configured and arranged to encode the difference information. The difference information is encoded as encoded data representing the difference information at a variable quality that is successively increased until a quality threshold is satisfied. An image reconstructor is configured and arranged to construct the reconstructed image as a function of the difference information. Initially, the reconstructed image comprises a previously-transmitted image. A second memory is configured and arranged to store the reconstructed image.

In still another embodiment of the invention, a method for generating an image is provided. A image is constructed based on data received from a communications channel. The image represents a previously-transmitted image and is stored in a memory. Difference information is received from the communications channel, and a new image is constructed based on the image and on the difference information and is stored in the memory. This process is repeated, with the quality of the new image being increased at each iteration until the quality satisfies a threshold condition. This method can be performed by a system according to another embodiment of the invention.

In another method embodiment of the invention, a still image is generated at a receiving terminal based on a first image received from a communications channel in response to a previous still image request by storing the first image in a memory. Difference information is received from the communications channel and is used with the image stored in the memory in constructing a new image. The new image is stored in the memory. These steps are repeated until a quality of the new image satisfies a threshold condition by increasing the quality of the new image at each iteration at least in part by incorporating the difference information into the new image.

In yet another embodiment of the invention, a system for generating a still image having a desired quality is provided. The system includes a still mode enabler, which is configured and arranged to selectively enable a still mode, and a decoder, which configured and arranged to decode data received from a communications channel. An image constructor, responsive to the decoder, includes a summing block for iteratively incorporating difference information into a previously-received image to generate an updated image. As additional difference information is received, the quality of the updated image is progressively improved. Initially, the difference information represents a difference between the still image and the previously-received image. A memory responsive to the image constructor is configured and arranged to store the updated image.

BRIEF DESCRIPTION OF THE DRAWINGS

Various aspects and advantages of the present invention will become apparent upon reading the following detailed description of various embodiments and upon reference to the drawings in which:

FIG. 2A illustrates in block diagram form an embodiment of an encoding arrangement according to the present invention;

FIGS. 6A–6B are a flow chart illustrating the operation of the encoding and decoding arrangement illustrated in FIGS. 4–5.

Figure 1:
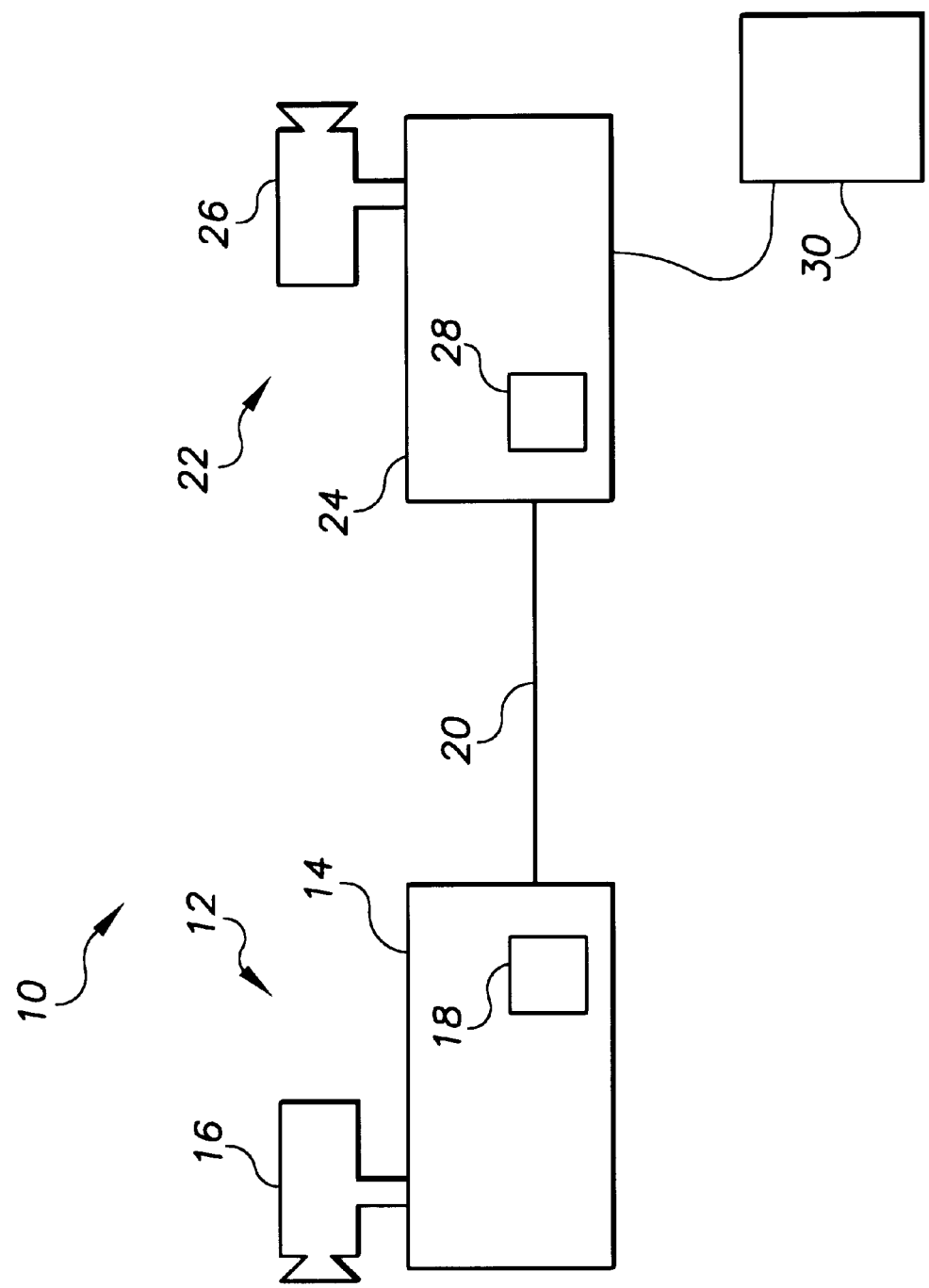
FIG. 1 illustrates a videoconferencing system implementing an embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DESCRIPTION OF THE VARIOUS EMBODIMENTS

The present invention is believed to be applicable to a variety of systems and arrangements that transmit images. The present invention has been found to be particularly advantageous in videoconferencing applications in which still images are transmitted. While the present invention is not so limited, an appreciation of various aspects of the invention is thus gained through a discussion of various application examples operating in this type of application.

FIG. 1 illustrates an example videoconferencing system 10 particularly suited for use in connection with the present invention. A first videoconferencing station 12 includes a first terminal 14 that receives images from a camera 16. The images are processed by a codec in the terminal 14 and are transmitted over a communications channel 20. For example, the images may be transmitted over a telephone line, an ISDN line, an Internet channel, or a similar communications network. The images are then received by a second videoconferencing station 22, including a second terminal configured to be compatible with the first terminal. To facilitate the discussion below, the first and second terminals 14 and 24 are respectively referred to as local and remote terminals. It should be understood, however, that the features described can be incorporated into either or both terminals. The remote videoconferencing station 22 may further include a camera 26 and a codec 28. The remote videoconferencing station 22 receives the images over the communications channel 20 from the local videoconferencing station 12 and decodes them using the codec 28. The decoded images may be displayed on a display monitor 30. In this manner, meetings can be conducted, for example, with participants separated by long distances with all meeting participants able to see each other.

In order to transmit a still image quickly, the codec 18 initially compresses a still image as a relatively small data packet representing the still image with relatively low quality. The data packet is transmitted over the communications channel 20 in a relatively short period of time due to the small size of the data packet. The data packet is received by the remote videoconferencing station 22 and is decoded by the codec 28, and the relatively low quality decoded image is displayed for viewing.

Control of the still mode operation can be performed at one or both stations. As described more fully below, in accordance with one embodiment of the present invention only the transmitting (e.g., local) terminal needs to be equipped with still mode functionality. The local terminal uses standards-compliant image transmission techniques such that any remote terminal which complies with the standards for video transfers will be capable of handling the still mode video information transmitted by the local terminal. Where both terminals include still mode capability, either the local or remote station can initiate a transfer of a still mode image from the local terminal to the remote terminal. For example, a user at the remote videoconferencing station may request via a control channel in the videoconferencing standards that a still mode image be sent. The requester can further select the desired quality of the still image.

Figure 2B:
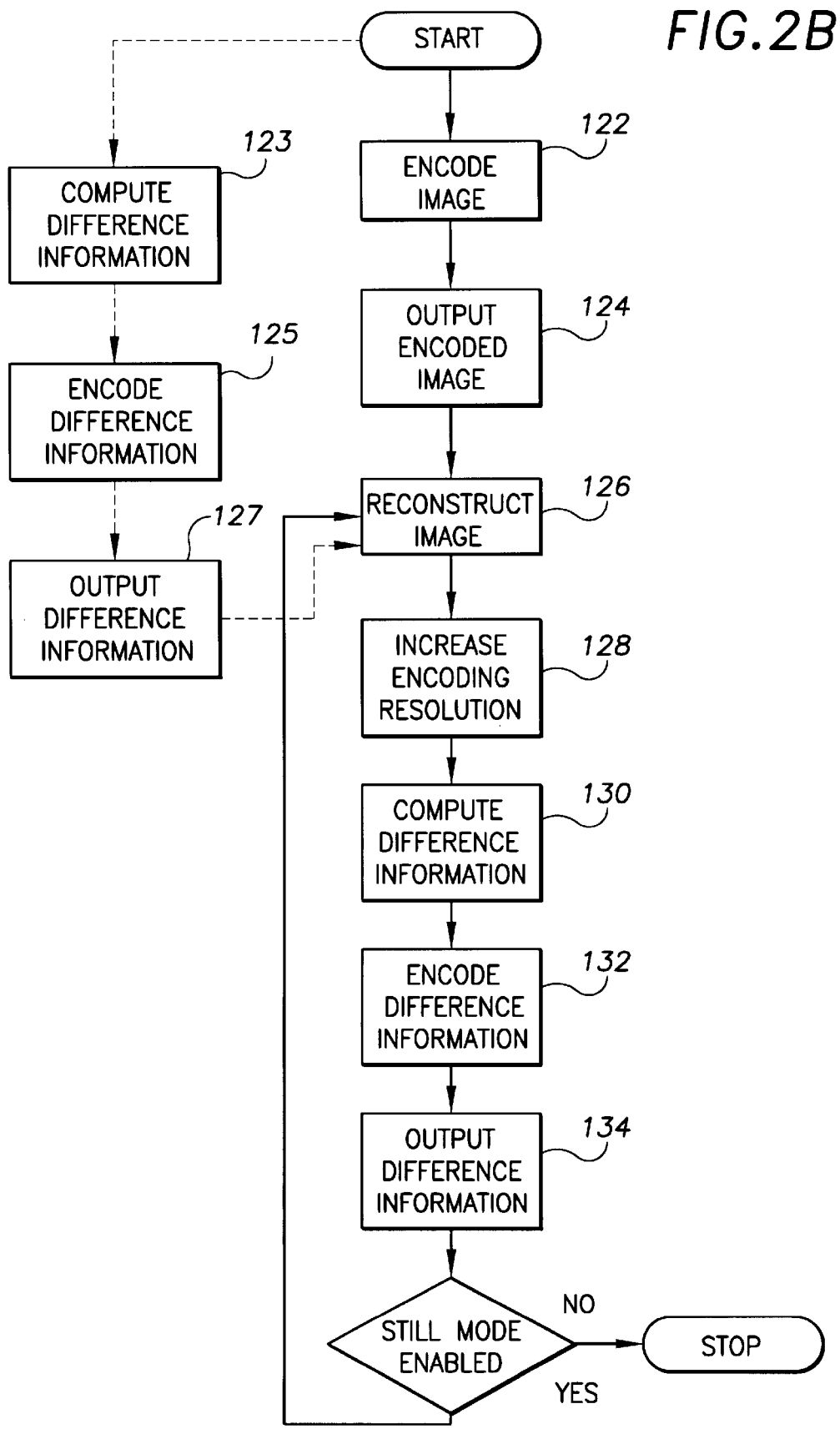
FIG. 2B is a flow chart illustrating the operation of the encoding arrangement illustrated in FIG. 2A.

FIGS. 2A and 2B illustrate a, particular embodiment of an encoding arrangement 100 that can be used to transmit high quality still images in accordance with one aspect of the present invention. In the illustrated embodiment, a memory 101 stores an image received from a video camera 102. In response to a still mode control signal from a still mode control block 103, transmission of images from the video camera 102 to the memory 101 is suspended. Instead, the memory 101 stores the last image received from the video camera 102 as a still image. The still image is sent to a difference information generator 104, which is configured and arranged to calculate difference information representing the difference between the still image and a reconstructed image stored in a memory 106, such as a frame buffer. Initially, the memory 106 might not contain a reconstructed image, and the difference information generator 104 passes the entire still image to a variable quality encoder 108, which compresses the still image as a first set of encoded data at step 122. This encoded data is stored in a memory 110, such as a buffer, for transmission using a communications channel 112 at a step 124.

Alternatively, the memory 106 may contain the last reconstructed image, which is also present at the remote terminal from a previous transmission of an encoded image. If the memory 106 contains the last reconstructed image, the difference information generator computes difference information based on the still image stored in the memory 101 and the reconstructed image stored in the memory 106, as depicted at a block 123. As depicted at a block 125, the difference information is then encoded as a first set of encoded data that represents the difference image with a relatively low quality as determined by the initial quality level used by the variable quality encoder 108. At a block 127, the encoded data is stored in the memory 110 for transmission using the communications channel 112.

A reconstructor 114 constructs a reconstructed image based on the first set of encoded data at step 126, as more fully described below, and stores the reconstructed image in the memory 106. Because the first set of data represents the still image at the relatively low quality, the reconstructed image has a lower quality than the still image. At step 128, the encoding quality is increased.

The difference information generator 104 computes difference information based on the still image stored in the memory 101 and the reconstructed image stored in the memory 106 at step 130. At step 132, the variable quality encoder 108 encodes the difference information at the increased encoding quality according to an existing video compression standard for transmitting difference information, such as the ITU-T H.261 or H.263 recommendation. Standards of this type typically encode video information as image data and a set of motion vector, which carry information relating to the motion of various subimages, such as pixels or blocks, from one frame to the next. In one embodiment of the invention, this type of standard may be used to encode the difference information used in the still mode with the motion vector set to zero. In this manner, as described more fully below, a conventional decoder can be used to receive the still images since the transmitted data is fully compliant with these standards.

At step 134, the difference information is stored in the memory 110 for transmission over the communications channel 112. As long as the still mode is still enabled, new reconstructed images having successively increasing qualities are constructed by iteratively incorporating new difference information into the reconstructed image stored in the memory 106. With each iteration, the new reconstructed image is stored in the memory 106, and new difference information is then computed as a difference between the still image stored in the memory 101 and the new reconstructed image. As described more fully below, the difference information is also used by the remote terminal in conjunction with the originally transmitted low quality image to build iteratively a higher quality still image at the remote location. This process stops when the still mode is disabled or when a desired quality is reached. Rather than modifying the quality of the difference information directly, the original image could be repeatedly encoded at successively increasing qualities, with difference information between the original and encoded images being calculated and processed for transmission over the communications channel 112 in each iteration.

Figure 3A:
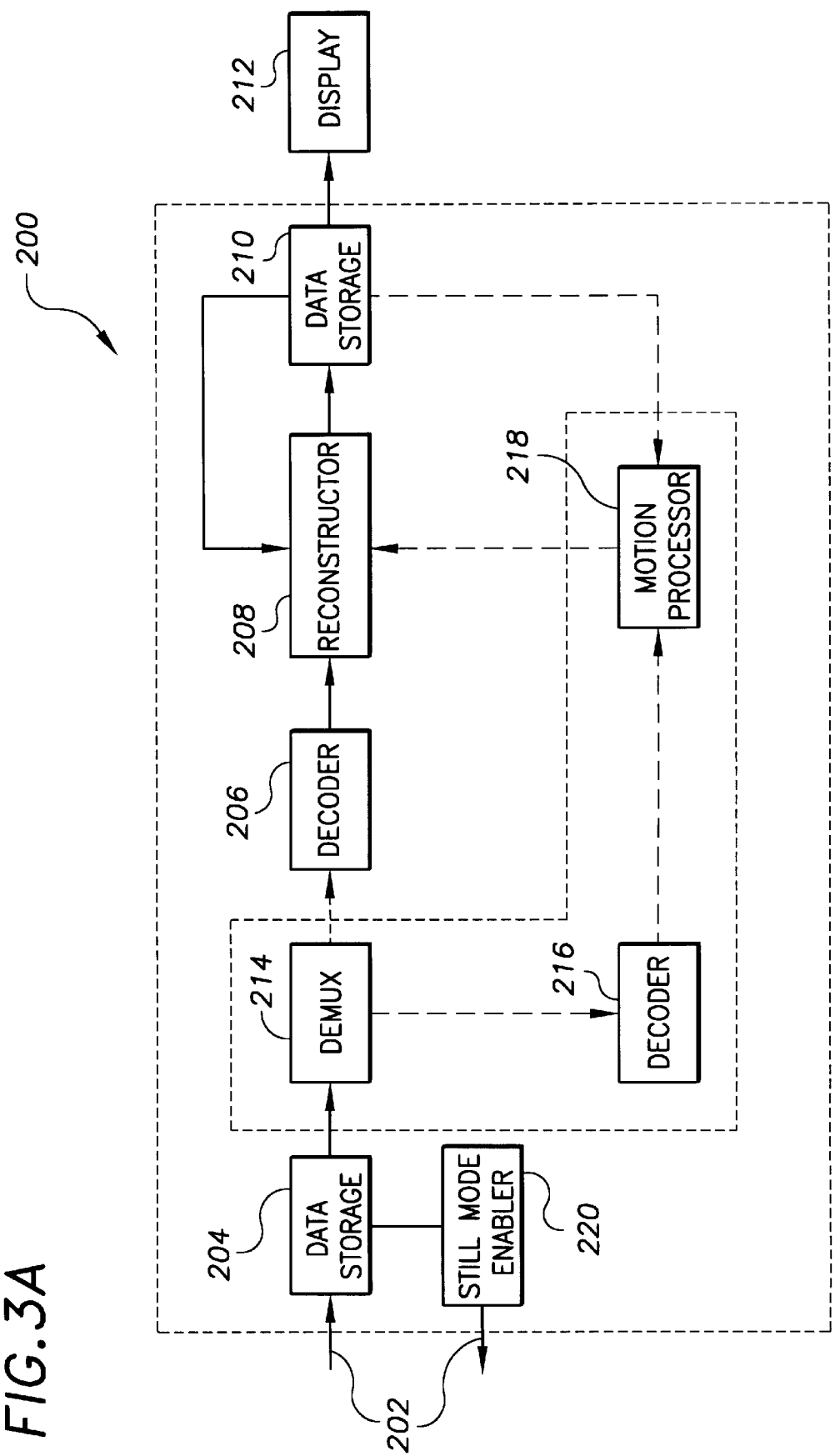
FIG. 3A illustrates in block diagram form an embodiment of a decoding arrangement according to the present invention.
Figure 3B:
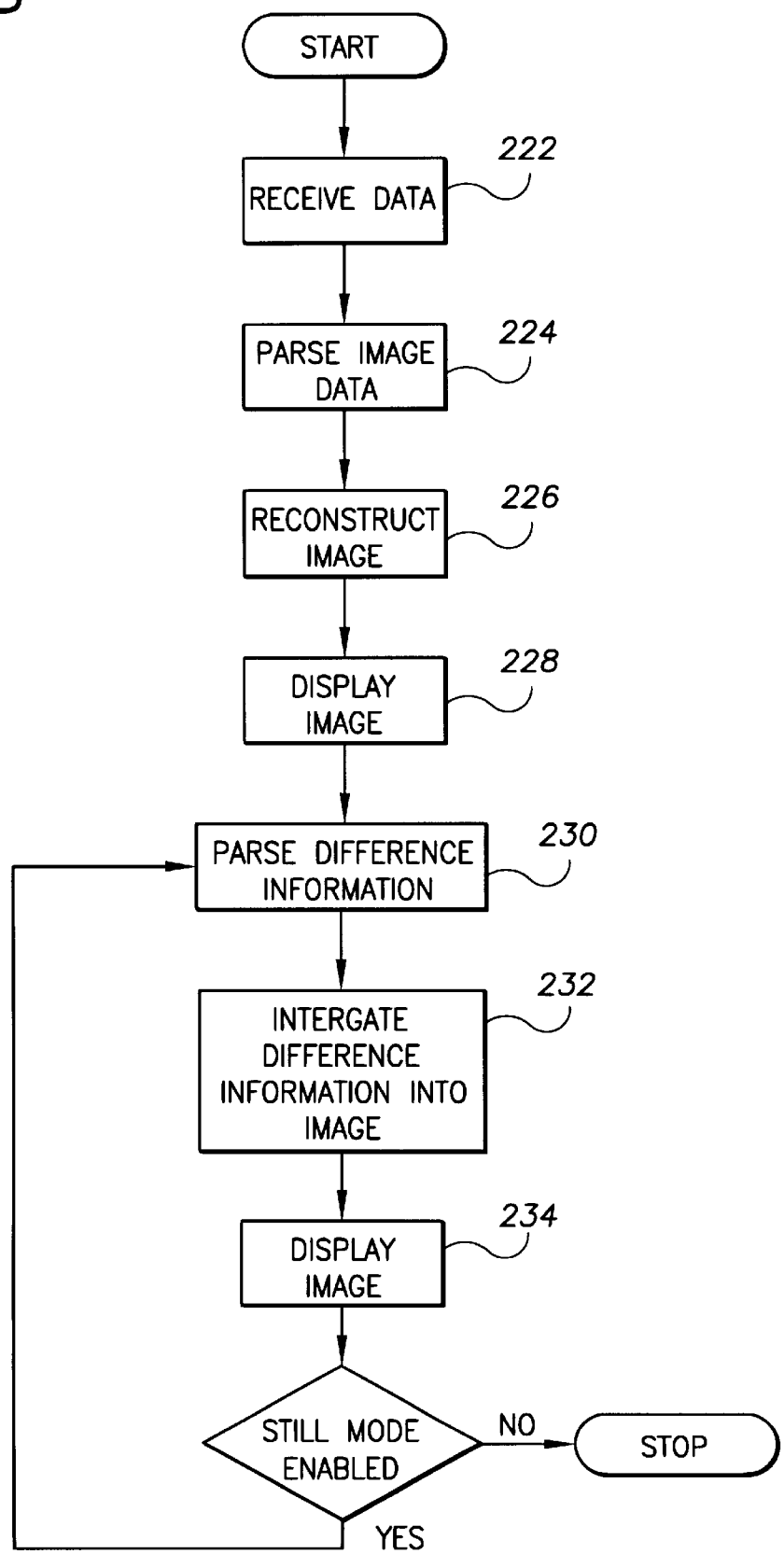
FIG. 3B is a flow chart illustrating the operation of the decoding arrangement depicted in FIG. 3A.

FIGS. 3A and 3B illustrate a particular embodiment of a decoding arrangement 200 that can be used to receive high quality still mode images in accordance with another aspect of the present invention. A data stream is received over a communications channel 202 at step 222 and is stored in a memory 204, such as a buffer. A decoder 206 decodes the data stream into image data at step 224. The image data is received by a reconstructor 208, which constructs a first reconstructed image at step 226. The first reconstructed image is stored in a memory 210, such as a frame buffer, and is displayed on a display device 212 at step 228. The first reconstructed image may be displayed on, for example, a computer monitor or a television. Additional data received over the communications channel 202 supplements the image data with difference information representing the difference between the image stored in the memory 210 and a newly reconstructed higher quality representation of the original still image at the local terminal. The additional data is decoded by the decoder 206 at step 230 and integrated into the reconstructed image by the reconstructor 208 at step 232. This integrated image is then stored in the memory 210 as a new reconstructed image for subsequent use. As the reconstructed image is developed progressively, it is displayed by the display device 212 at step 234.

Additional difference information is received and decoded to repeatedly increase the quality of the reconstructed image until the desired quality is achieved or until the still mode is disabled, thereby returning the receiving terminal to real-time image transmission. In this manner, the receiving terminal receives a coarse image that improves in quality over time.

The decoding arrangement 200 can be implemented using a codec that complies with an existing video compression standard, such as the ITU-T H.261 or H.263 recommendation. A typical H.261- or H.263-compliant codec includes a demultiplexer 214, which parses the data stream received over the communications channel 202 into image data and motion data. The image data is decoded by the decoder 206 and reconstructed by the reconstructor 208 as described above. The motion data is decoded by a second decoder 216 into a set of motion vector. A motion processor 218 modifies the image stored in the memory 210 according to the motion vector.

When a still mode enabler 220 is engaged, it transmits a request to a transmitting terminal at the other end of the communications channel 202. In response to the request, the transmitting terminal progressively transmits a still image in the manner more fully described above with the motion vector set to zero. With no motion information conveyed by the motion vector, the second decoder 216, and the motion processor 218 effectively perform no function in the decoding arrangement 200.

Figure 4:
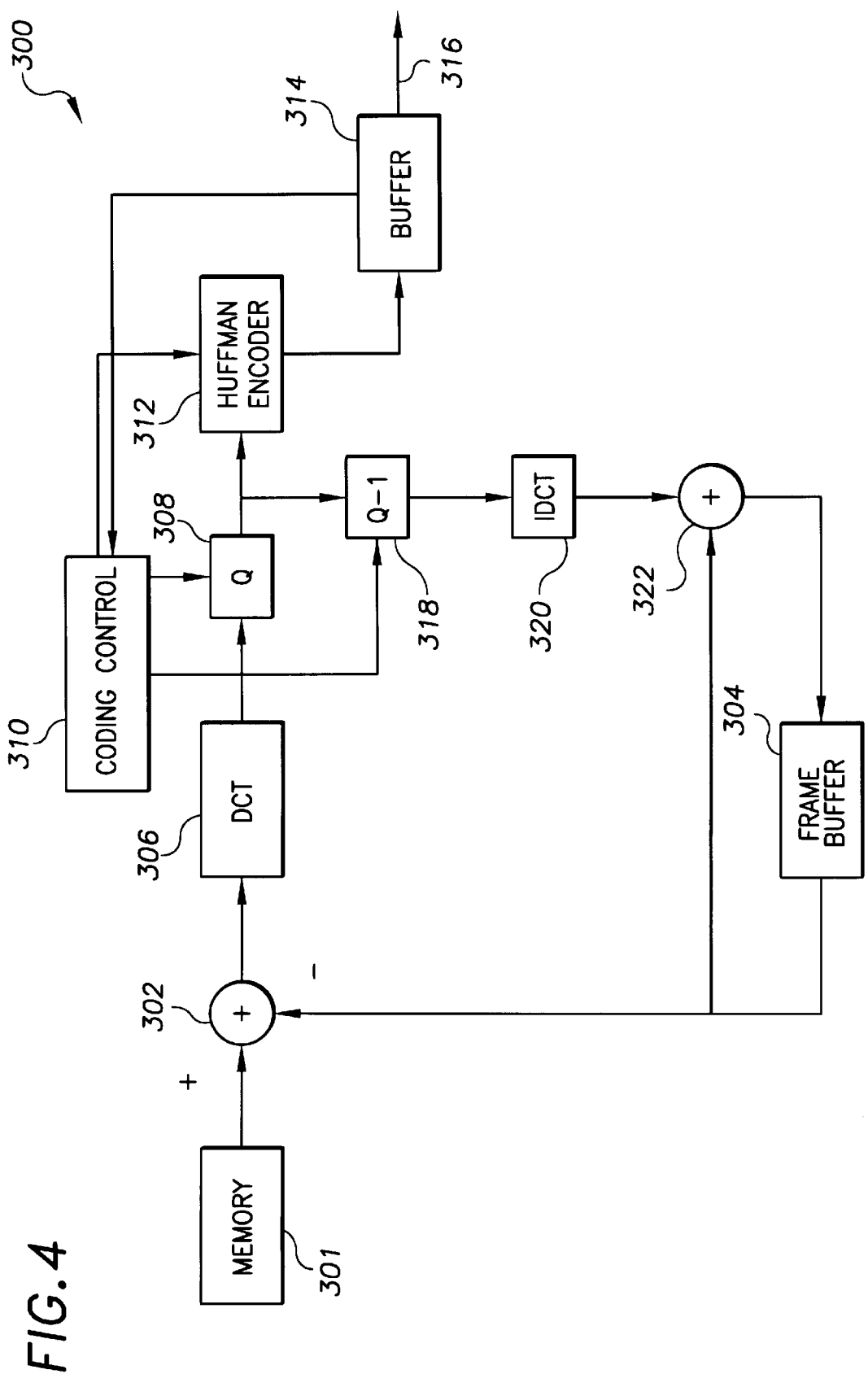
FIG. 4 illustrates in block diagram form another embodiment of an encoding arrangement according to the present invention.

FIG. 4 illustrates another embodiment of an encoding arrangement 300 that is particularly suited for use in the present invention. An original image is stored in a memory 301, such as a frame buffer. The original image is received by a summing element 302, which is configured and arranged to calculate difference information representing the difference between the original image and an image stored in a memory 304, such as a frame buffer. When no image is initially stored in the memory 304, the original image is passed to a transformation block 306, which transforms the image into coefficient data selected from a continuous range of values. In the illustrated example, the transformation block 306 performs a discrete cosine transform (DCT) on the original image.

The coefficient data is further transformed by a transformation block, illustrated as a quantizer 308, which is controlled by a coding control block 310. The quantizer 308 maps the coefficient data to a discrete set of values by dividing the continuous range of values into a set of non-overlapping subranges. Each subrange is mapped to a single value, such that whenever a coefficient falls within a given subrange, the quantizer 308 generates the corresponding discrete value. The size of the subranges and the quality of the quantization are controlled by the coding control block 310.

The quantized data thus generated is encoded by an encoding block, illustrated as a Huffman encoder 312. For example, the quantized data may be encoded as a run length vector. The encoded data is stored in a memory 314 for transmission over a communications channel 316.

The quantized data is also received by a transformation block 318. The transformation block 318, implemented as an inverse quantizer in the illustrated example, maps the quantized data to a continuous range of values. The quality of the inverse quantization is controlled by the coding control block 310. A second transformation block 320 further transforms the quantized data using an inverse discrete cosine transform (IDCT) to reconstruct the image as it would be seen at a remote videoconferencing station. The reconstructed image is incorporated into the image previously stored in the memory 304 by a summing element 322, and the image thus produced is stored in the memory 304. The memory 304 provides the reconstructed image to the summing element 302, and the process is repeated, each time increasing the quality specified by the coding control block 310 until a desired quality is achieved. In this manner, the image is progressively built from a coarse representation having a relatively low quality to a sharp representation having a higher quality.

Figure 5:
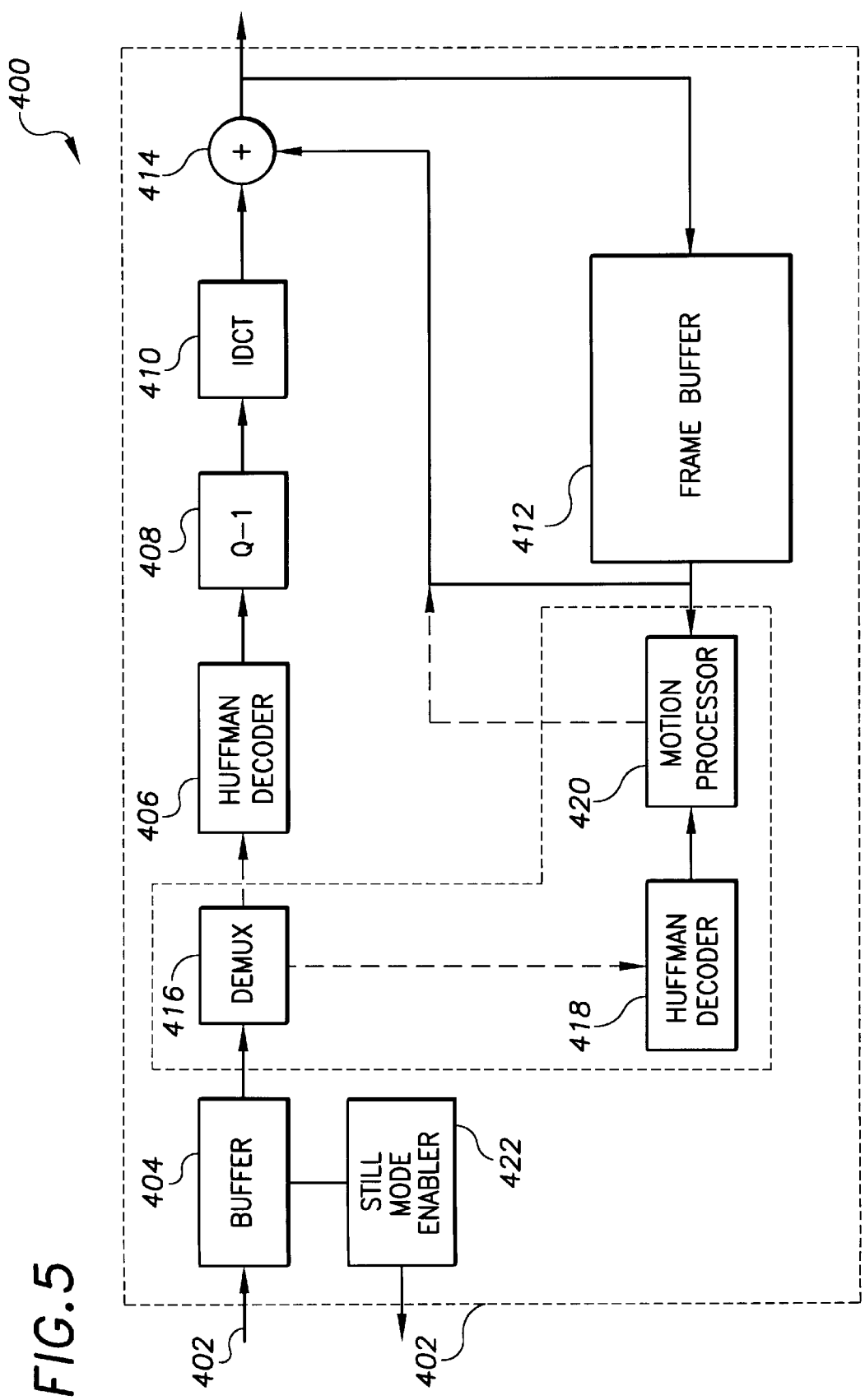
FIG. 5 illustrates in block diagram form another embodiment of a decoding arrangement according to the present invention.

FIG. 5 illustrates another embodiment of a decoding arrangement 400 that is particularly suited for use in the present invention. A data stream received over a communications channel 402 is stored in a memory 404, implemented as a buffer in the illustrated example. A decoder, illustrated as a Huffman decoder 406, decodes the data stream into image data and provides the image data to a transformation block 408. The transformation block 408, implemented as an inverse quantizer in the illustrated example, maps the image data to a continuous range of values. A second transformation block 410 further transforms the continuous value using an inverse discrete cosine transform (IDCT) to reconstruct the difference information received from the local terminal. A summing element 414 integrates the difference information into the image previously stored in a memory 412, depicted as a frame buffer, and the image thus produced is stored in the memory 412 and displayed by a display device. Additional data received over the communications channel 402 is integrated into the stored image to improve its quality. As a result, the image quality progressively improves as long as the still mode is enabled.

The decoding arrangement 400 can be implemented using a codec that complies with an existing video compression standard, such as the ITU-T H.261 or H.263 recommendation. A typical H.261- or H.263-compliant codec includes a demultiplexer 416, which parses the data stream received over the communications channel 402 into image data and motion data. The image data is decoded by the Huffman decoder 406 and transformed by the transformation blocks 408 and 410 as described above. The motion data, on the other hand, is decoded by a second Huffman decoder 418 into a set of motion vector. A motion processor 420 modifies the image stored in the memory 412 according to the motion vector and sends the modified image to the summing element 414. With no motion information being conveyed by the motion vector, the demultiplexer 416, the second Huffman decoder 418, and the motion processor 420 effectively perform no function in the decoding arrangement 400. Thus, when a conventional decoder arrangement having this construction receives the still image information transmitted from the local station, it progressively improves the quality without any additional hardware or software.

The decoder arrangement may also include a still mode enabler 422, which when engaged, transmits a signal to the local (transmitting) terminal at the other end of the communications channel 402 to initiate a still mode high quality image transmission. In response to the signal, the transmitting terminal transmits a still image as described more fully above with the motion vector set to zero.

Figure 6A:
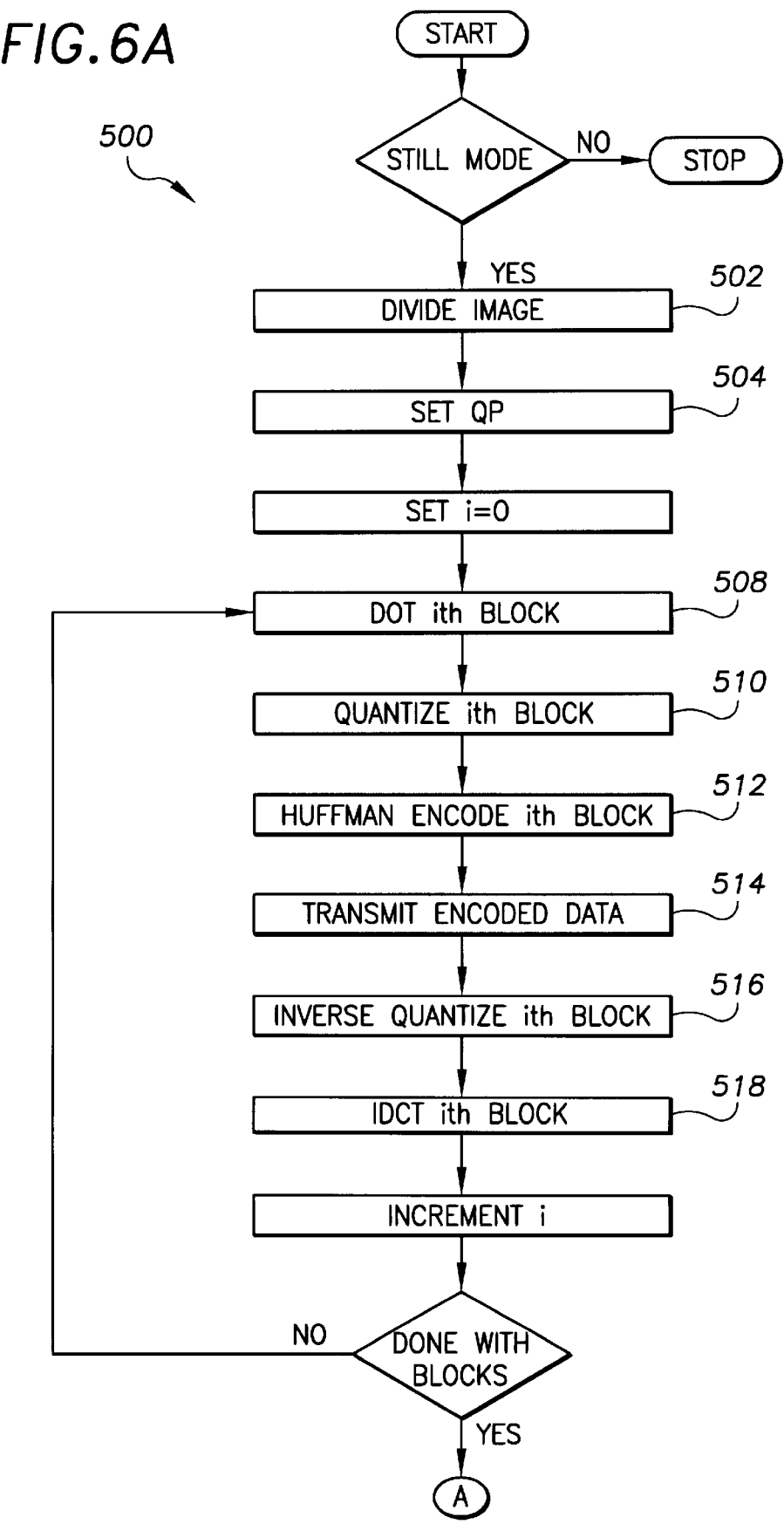

FIGS. 6A–6B illustrate a particular embodiment of a method 500 that can be used to transmit and receive high quality still mode images in connection with the encoding and decoding arrangements illustrated in FIGS. 4–5. If the still mode is enabled, an image is divided into blocks of pixels at step 502. For example, each block may be an eight pixel-by-eight pixel square.

Next, the coding control block 310 initializes a quantization parameter QP at step 504. The quantization parameter QP is used to control the quality of the block generated by the encoding arrangement 300 of FIG. 4. For example, the quantization parameter QP may vary over a range of 1 to 31, with quality increasing as the quantization parameter QP decreases.

The transformation block 306 transforms each block according to a discrete cosine transform (DCT) at step 508 to obtain a coefficient vector comprising a coefficient for each pixel of the block. Assuming the image is divided into 8×8 blocks of pixels, for example, the coefficient vector comprises sixty-four coefficients. The coefficients may vary over a continuous range of values. At step 510, the quantizer 308 quantizes each coefficient to one of a discrete set of values by dividing the continuous range of values into a set of non-overlapping subranges. Each subrange is mapped to a single value, such that whenever a coefficient falls within a given subrange, the quantizer 308 generates the corresponding discrete value at step 510. The size of the subranges is determined by the quantization parameter QP. Larger values of QP produce larger subranges and coarser quantization. Conversely, smaller values of QP produce smaller subranges and finer quantization. Accordingly, coding control block 310 initializes the quantization parameter QP to a relatively large value in step 504. For example, QP may be initially set to a value of 31. Some applications, however, benefit from a lower initial value of the quantization parameter QP. For example, an image may have already been transmitted and received with a quality corresponding to a lower value of the quantization parameter QP.

The quantized data thus generated at step 510 is encoded at step 512 into a set of encoded data. For example, the quantized data may be Huffman encoded by the Huffman encoder 312 as a run length vector. The encoding arrangement 300 transmits the set of encoded data at step 514 over the communications channel.

The set of encoded data is also inverse quantized by the transformation block 318 at step 516 and transformed according to an inverse discrete cosine transform (IDCT) by the second transformation block 320 at step 518 to reconstruct a block as seen by a viewer at a remote videoconferencing station. Because this reconstruction is based on quantized data, the reconstructed block has a lower quality than the original block.

After all the blocks have been reconstructed through blocks 508 through 518, the coding control block 310 determines whether the quantization parameter QP is greater than one at a decision step 524. If the quantization parameter QP is greater than one and the still mode is still enabled, the coding control block 310 decrements the quantization parameter QP at step 528, thereby increasing the encoding quality.

At steps 532 through 544, the encoding arrangement 300 computes and encodes difference information for each of the blocks making up the original still image. The summing block 302 computes difference information as a difference between the original $i^{th}$ block stored in the memory 301 and the reconstructed $i^{th}$ block generated at steps 516 and 518 and stored in the memory 304.

Next, the transformation block 306 transforms the difference information according to a DCT at step 534 to obtain a coefficient vector. The quantizer 308 quantizes the difference information according to the decremented quantization parameter QP at step 536. Because the coding control block 310 decremented the quantization parameter QP at step 528, the difference information is quantized at a higher quality than at step 510. The quantizer 308 thus generates level information at step 536.

The level information is encoded as a set of encoded information at step 538. In the illustrated example, the Huffman encoder 312 encodes the level information as a run length vector. The encoding arrangement 300 transmits the encoded information over the communications channel at step 540.

The transformation block 318 inverse quantizes the level information at step 542. The inverse quantized difference information is transformed according to an IDCT by the transformation block 320 to generate a difference block at step 544. At step 546, the reconstructed block generated by the transformation block 320 at step 518 is updated by adding the difference block generated by the transformation block 320 at step 544. It will be appreciated by those skilled in the art that steps 542, 544, and 546 are also respectively performed by the transformation blocks 408, 410, and 414 of the decoding arrangement 400 at the receiving terminal after the incoming data stream has been decoded by the Huffman decoder 406.

After all of the blocks have been processed according to blocks 532 through 544, the quantization parameter QP is successively decremented and the blocks are reprocessed using the decremented quantization parameter QP, thereby increasing the encoding quality at each iteration of steps 532 through 544. This process continues until either the quantization parameter QP is decremented to one or until the still mode is disabled by a user at the remote videoconferencing station.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. For use in transmitting a still image at a desired quality using a communications channel, a system comprising:

a still mode control block configured and arranged to selectively enable a still mode;

a first memory configured and arranged to, when the still mode is not enabled, store a series of images in succession, and, when the still mode is enabled, store one of the series of images as the still image to be transmitted;

a difference information generator configured and arranged to generate difference information representing a difference between a reconstructed image and the still image;

a variable quality encoder configured and arranged to encode the difference information as encoded data representing the difference information at a variable quality and to successively increase the quality until a quality threshold is satisfied;

an image reconstructor configured and arranged to construct the reconstructed image as a function of the difference information, the reconstructed image initially comprising a previously-transmitted image; and a second memory configured and arranged to store the reconstructed image.

2. A system, according to claim 1, further comprising an image receiving device coupled to the first memory and configured and arranged to receive an image.

3. A system, according to claim 1, further comprising an output memory, coupled to the communications channel and responsive to the variable quality encoder and configured and arranged to transmit the encoded data over the communications channel.

4. A system, according to claim 1, wherein the variable quality encoder comprises a transformation block configured and arranged to transform the data into a form for quantization.

5. A system, according, to claim 4, wherein the the variable quality encoder is configured and arranged to quantize the data based on the parameter, wherein a high parameter value indicates lower signal quality, and wherein transformation is via use of a discrete cosine transformation.

6. A system, according to claim 1, wherein the image reconstructor incorporates the difference information into the first image.

7. For use in transmitting a still image at a desired quality between first and second stations using a communications channel, a system comprising:

a still mode control block configured and arranged to selectively enable a still mode;

a first memory configured and arranged to, when the still mode is not enabled, store a series of images in succession, and, when the still mode is enabled, store one of the series of images as the still image to be transmitted;

a difference information generator configured and arranged to generate difference information representing a difference between a function of a reconstructed image and the still image;

a variable quality encoder configured and arranged to encode the difference information as encoded data representing the difference information at a variable quality and to successively increase the quality until a quality threshold is satisfied;

an image reconstructor configured and arranged to construct a new reconstructed image as a function of the difference information and the previous reconstructed image; and a second memory configured and arranged to store the new reconstructed image.

8. A system, according to claim 7, wherein the function of a reconstructed image is an identity function.

9. A system, according to claim 7, wherein the still mode control block is configured and arranged to selectively enable a still mode function in response to an input from a remote one of the first and second stations.

10. A system, according to claim 7, wherein the still mode control block is configured and arranged to selectively enable a still mode function in response to an input from a local one of the first and second stations.

11. A system, according to claim 7, wherein a first one of the reconstructed image uses a previously transmitted image.

12. A system, according to claim 7, wherein the still mode control block is configured and arranged to selectively enable a still mode function in response to an input from one of the first and second stations, and the desired quality is selected from said one of the first and second stations.

13. For use in transmitting a still image at a desired quality between first and second stations using a communications channel, a system comprising:

still mode control means for selectively enable a still mode;

first memory means for, when the still mode is not enabled, storing a series of images in succession, and, when the still mode is enabled, storing one of the series of images as the still image to be transmitted;

difference information generation means for generating difference information representing a difference between a function of a reconstructed image and the still image;

variable quality encoding means for encoding the difference information as encoded data representing the difference information at a variable quality and for successively increasing the quality until a quality threshold is satisfied;

image reconstruction means for constructing a new reconstructed image as a function of the difference information and the previous reconstructed image; and second memory means for storing the new reconstructed image.

14. A method of causing a still image to be transmitted at a desired quality between first and second stations using a communications channel, comprising:

selectively enabling a still mode from one of the first and second stations;

when the still mode is not enabled, storing a series of images in succession, and, when the still mode is enabled, storing one of the series of images as the still image to be transmitted;

generating difference information representing a difference between a function of a reconstructed image and the still image;

using a variable quality encoding process, encoding the difference information as encoded data representing the difference information at a variable quality and successively increasing the quality until a quality threshold is satisfied;

constructing a new reconstructed image as a function of the difference information and the previous reconstructed image; and storing the new reconstructed image.

* * * * *